United States Patent
Okuda et al.

(10) Patent No.: US 11,760,861 B2
(45) Date of Patent: Sep. 19, 2023

(54) CARBON FIBER BUNDLE, MANUFACTURING METHOD THEREFOR, PREPREG, AND CARBON FIBER-REINFORCED COMPOSITE MATERIAL

(71) Applicant: Toray Industries, Inc., Tokyo (JP)

(72) Inventors: Haruki Okuda, Ehime (JP); Naohiro Matsumoto, Ehime (JP); Yuki Sada, Ehime (JP); Fumihiko Tanaka, Ehime (JP)

(73) Assignee: Toray Industries, Inc., Tokyo (JP)

( * ) Notice: Subject to any disclaimer, the term of this patent is extended or adjusted under 35 U.S.C. 154(b) by 554 days.

(21) Appl. No.: 17/044,414

(22) PCT Filed: Apr. 10, 2019

(86) PCT No.: PCT/JP2019/015620
§ 371 (c)(1),
(2) Date: Oct. 1, 2020

(87) PCT Pub. No.: WO2019/203088
PCT Pub. Date: Oct. 24, 2019

(65) Prior Publication Data
US 2021/0108041 A1    Apr. 15, 2021

(30) Foreign Application Priority Data

Apr. 16, 2018  (JP) .................................. 2018-078129
Jun. 26, 2018  (JP) .................................. 2018-120571
Sep. 28, 2018  (JP) .................................. 2018-183751

(51) Int. Cl.
*C08K 3/04*       (2006.01)
*C08K 7/06*       (2006.01)
*D01F 9/22*       (2006.01)
*C08J 5/24*       (2006.01)

(52) U.S. Cl.
CPC ................. *C08K 3/04* (2013.01); *C08J 5/243* (2021.05); *C08K 7/06* (2013.01); *D01F 9/22* (2013.01); *C08J 2363/00* (2013.01)

(58) Field of Classification Search
CPC .... C08K 3/04; C08K 7/06; C08J 5/243; C08J 2363/00; D01F 9/22
See application file for complete search history.

(56) References Cited

U.S. PATENT DOCUMENTS

| | | | |
|---|---|---|---|
| 2008/0299389 | A1 | 12/2008 | Kawakami et al. |
| 2013/0130584 | A1 | 5/2013 | Fujiwara et al. |
| 2015/0361591 | A1 | 12/2015 | Watanabe et al. |

FOREIGN PATENT DOCUMENTS

| | | |
|---|---|---|
| EP | 2 080 775 A1 | 7/2009 |
| EP | 3 467 165 A1 | 4/2019 |
| JP | H03-180514 A | 8/1991 |
| JP | 2002-054031 A | 2/2002 |
| JP | 2008-308776 A | 12/2008 |
| JP | 2014-141761 A | 8/2014 |
| JP | 2014-159665 A | 9/2014 |
| JP | 2015-010290 A | 1/2015 |
| JP | 2015-067910 A | 4/2015 |
| RU | 2 036 718 C1 | 6/1995 |
| RU | 2 432 422 C2 | 10/2011 |
| RU | 2 509 651 C1 | 3/2014 |
| WO | 2017/204026 A1 | 11/2017 |

OTHER PUBLICATIONS

The Extended European Search Report dated Dec. 2, 2021, of counterpart European Application No. 19788602.1.
An Official Action dated Nov. 19, 2021, of counterpart Russian Patent Application No. 2020134445, along with an English translation.

*Primary Examiner* — Edward J Cain
(74) *Attorney, Agent, or Firm* — DLA Piper LLP (US)

(57) ABSTRACT

A carbon fiber bundle has a relationship among a crystallite size Lc (nm), a single-fiber compressive strength Fc (GPa) measured by a compressive fragmentation method of single-fiber composites, and an initial modulus $E_0$ (GPa) in a resin-impregnated strand tensile test simultaneously satisfies formulas (1) to (3), and Lc is 4.00 nm or less:

$$Fc \geq 1.3 \times 10/Lc - 0.3 \quad (1)$$

$$E_0 \leq 80 \times Lc + 155 \quad (2)$$

$$E_0 \geq 330 \quad (3).$$

10 Claims, 1 Drawing Sheet

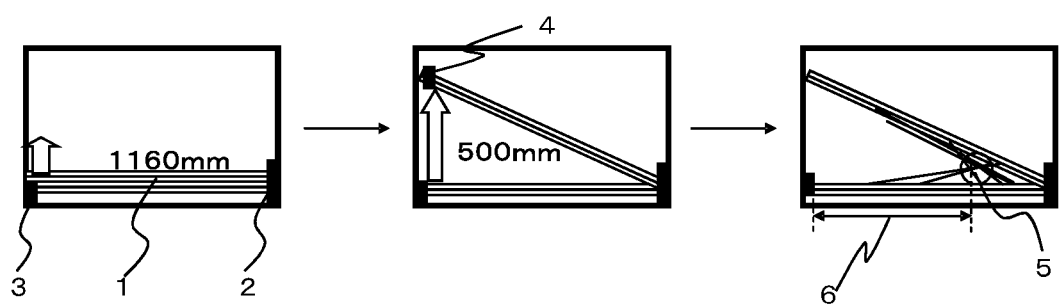

CARBON FIBER BUNDLE, MANUFACTURING METHOD THEREFOR, PREPREG, AND CARBON FIBER-REINFORCED COMPOSITE MATERIAL

TECHNICAL FIELD

This disclosure relates to a carbon fiber bundle suitably used in sports applications such as golf shafts and fishing rods, and other general industrial applications, and a manufacturing method therefor, a prepreg and a carbon fiber-reinforced composite material obtained by using the carbon fiber bundle.

BACKGROUND

In recent years, carbon fiber bundles have been actively used in various industrial fields as reinforcing fibers of fiber-reinforced composite materials because they have extremely high specific strength and specific tensile modulus. Particularly in fields where weight reduction is important, the replacement of conventional metal materials with carbon fiber composite materials is accelerating. Particularly in sports applications, weight reduction is required for golf shafts, fishing rods, bicycles, rackets and the like and their applications are expanding more and more.

For weight reduction in sports applications, it is required that the carbon fiber reinforced composite material has high tensile modulus and is excellent in a wide range of physical properties such as tensile strength and compressive strength. The most widely used polyacrylonitrile-based carbon fiber bundle is industrially produced through a stabilization process of converting the polyacrylonitrile-based precursor fiber bundle into a stabilized fiber bundle in an oxidizing atmosphere at 200 to 300° C.; a pre-carbonization process of converting the stabilized fiber bundle into a pre-carbonized fiber bundle by subjecting to pre-carbonization in an inert atmosphere at a maximum temperature of 500 to 1,000° C.; and a carbonization process of converting the pre-carbonized fiber bundle into a carbon fiber bundle by subjecting to carbonization in an inert atmosphere at a maximum temperature of 1,700 to 3,000° C. It is known that the tensile modulus of the carbon fiber-reinforced composite material is improved substantially in proportion to the resin-impregnated strand tensile modulus of the carbon fiber bundle (hereinafter "strand tensile modulus"). It is known that such strand tensile modulus can be increased by further raising the maximum temperature in the carbonization process. However, it is generally accepted that the carbon fiber bundle having a high strand modulus obtained by raising the maximum temperature of the carbonization process causes a decrease in compressive strength of carbon fiber reinforced composites due to an increase in crystallite size (JP 3-180514 A). There is also generally a trade-off relationship between the compressive strength and the strand tensile modulus of the carbon fiber-reinforced composite material. Therefore, studies have been performed to improve the strand tensile modulus without increasing the crystallite size. There has been proposed, as the technique to reduce the crystallite size of the carbon fiber bundle, for example, a technique to improve the compressive strength of single-fibers by implanting ions on a surface of carbon fibers to degrade the crystallinity of a carbon fiber surface layer (JP '514). There has been known, as a technique to improve the strand tensile modulus without increasing the crystallite size of the carbon fiber bundle, a technique to increase a stretching ratio in a carbonization process, and there have been proposed techniques to improve the stretchability in a carbonization process by interlacing or twisting the precursor fiber bundle to increase a stretching ratio in the carbonization process without causing deterioration of the processability (JP 2014-141761 A and JP 2014-159665 A) and a technique to increase the molecular weight of a polyacrylonitrile copolymer (JP 2008-308776 A). There has also been proposed a technique to improve the single-fiber compressive strength of the carbon fiber bundle by controlling a stabilized structure to improve the compressive strength of the carbon fiber-reinforced composite material without relying on stretching (JP 2015-10290 A).

In JP '514, although the crystallite size was decreased by implanting ions into carbon fibers, leading to an increase in apparent compressive strength measured by a loop method to at most 10.0 GPa, it was not satisfactory from the viewpoint of the balance with the strand tensile modulus. According to the techniques mentioned in JP '761 and JP '665, the precursor fiber bundle does not break even when high tension is applied in the carbonization process by interlacing or twisting the precursor fiber bundle. However, the single-fiber compressive strength was not satisfactory. According to the technique mentioned in JP '776, although the carbonization stretchability was improved and the strand tensile modulus was improved by increasing the molecular weight of the polyacrylonitrile copolymer, the single-fiber compressive strength was not satisfactory. According to the technique mentioned in JP '290, the single-fiber compressive strength can be increased by controlling the stabilized structure. However, the level of the strand tensile modulus is low, and when the maximum temperature of the carbonization process was simply raised based on the technique of JP '290, the single-fiber compressive strength significantly decreased, thus failing to achieve both strand tensile modulus and single-fiber compressive strength at a high level.

It could therefore be helpful to provide a carbon fiber bundle that simultaneously exhibits high compressive strength of a carbon fiber-reinforced composite material and high strand tensile modulus of a carbon fiber bundle, and a manufacturing method therefor, and a prepreg obtained by using the carbon fiber bundle.

SUMMARY

We thus provide:

A carbon fiber bundle wherein a relationship among a crystallite size Lc (nm), a single-fiber compressive strength Fc (GPa) measured by a compressive fragmentation method of single-fiber composites, and an initial modulus $E_0$ (GPa) in a strand tensile test simultaneously satisfies formulas (1) to (3), and Lc is 4.00 nm or less:

$$Fc \geq 1.3 \times 10/Lc - 0.3 \quad (1)$$

$$E_0 \leq 80 \times Lc + 155 \quad (2)$$

$$E_0 \geq 330 \quad (3).$$

A method of producing a carbon fiber bundle that includes obtaining a substantially not twisted carbon fiber bundle through a stabilization process of subjecting a polyacrylonitrile-based precursor fiber bundle to a heat treatment in an atmosphere containing oxygen; a pre-carbonization process of subjecting the fiber bundle obtained in the stabilization process to a heat treatment in an inert atmosphere at a maximum temperature of 500 to 1,000° C.; a carbonization process of subjecting the fiber bundle obtained in the pre-carbonization process to a heat treatment in an inert atmosphere at a maximum temperature of 1,700 to 3,000° C.; and a process of subjecting the fiber bundle obtained in the carbonization process to an oxidation treatment; wherein the stabilization process is performed until a ratio of a peak intensity at 1,453 cm$^{-1}$ to a peak intensity at 1,370 cm$^{-1}$ in an infrared spectrum of the fiber bundle is in a range of 0.60 to 0.70, and a ratio of a peak intensity at 1,254 cm$^{-1}$ to a peak intensity at 1,370 cm$^{-1}$ in an infrared spectrum is 0.50 to 0.65; and a tension of the fiber bundle in the carbonization process is 4.0 to 6.0 mN/dtex, and the carbonization process is performed until a relationship between a crystallite size Lc (nm) in the fiber bundle and a maximum temperature T satisfies: Lc≥2.00×10$^{-3}$×T−0.90.

A method of producing a carbon fiber bundle that includes obtaining a carbon fiber bundle through a stabilization process of subjecting a polyacrylonitrile-based precursor fiber bundle to a heat treatment in an atmosphere containing oxygen; a pre-carbonization process of subjecting the fiber bundle obtained in the stabilization process to a heat treatment in an inert atmosphere at a maximum temperature of 500 to 1,000° C.; a carbonization process of subjecting the fiber bundle obtained in the pre-carbonization process to a heat treatment in an inert atmosphere at a maximum temperature of 1,700 to 3,000° C.; and a process of subjecting the fiber bundle obtained in the carbonization process to an oxidation treatment; wherein a tension of the fiber bundle in the stabilization process is 1.0 mN/dtex or more;

the stabilization process is performed until a ratio of a peak intensity at 1,453 cm$^{-1}$ to a peak intensity at 1,370 cm$^{-1}$ in an infrared spectrum of the fiber bundle is in a range of 0.60 to 0.70, and a ratio of a peak intensity at 1,254 cm$^{-1}$ to a peak intensity at 1,370 cm$^{-1}$ in an infrared spectrum is 0.50 to 0.65; and the number of twists of the fiber bundle in the carbonization process is 2 turns/m or more or a twist angle of a surface of the fiber bundle is 0.2° or more, and a tension of the fiber bundle in the carbonization process is 4.0 mN/dtex or more.

According to the carbon fiber bundle, it is possible to obtain the effect of achieving both the compressive strength of a carbon fiber-reinforced composite material and the strand tensile modulus of a carbon fiber bundle at a high level. According to the prepreg, it is possible to obtain the effect of achieving both the compressive strength and the tensile modulus of a carbon fiber-reinforced composite material at a high level.

BRIEF DESCRIPTION OF THE DRAWING

FIG. 1 is a view showing a method of measuring a tearable length.

EXPLANATION OF NUMERALS

1: Fiber bundle
2: Fixed point A
3: Fixed point B
4: Fixed point C
5: Interlacing point
6: Tearable length

DETAILED DESCRIPTION

In the carbon fiber bundle, a relationship among a crystallite size Lc (nm), a single-fiber compressive strength Fc (GPa) measured by a compressive fragmentation method of single-fiber composites, and an initial modulus $E_0$ (GPa) in a strand tensile test simultaneously satisfies formulas (1) to (3):

$$Fc \geq 1.3 \times 10/Lc - 0.3 \tag{1}$$

$$E_0 \leq 80 \times Lc + 155 \tag{2}$$

$$E_0 \geq 330 \tag{3}.$$

The carbon fiber bundle that simultaneously satisfies these three formulas can achieve both the compressive strength of a carbon fiber-reinforced composite material and the strand tensile modulus of a carbon fiber bundle at a high level. Each formula will be individually described below.

In the carbon fiber bundle, a relationship among a crystallite size Lc (nm), a single-fiber compressive strength Fc (GPa) measured by a compressive fragmentation method of single-fiber composites, and an initial modulus $E_0$ (GPa) in a strand tensile test is in a range of formula (1):

$$Fc \geq 1.3 \times 10/Lc - 0.3 \tag{1}.$$

In the carbon fiber bundle, the right side of formula (1) is more preferably 1.3×10/Lc+0.1, and still more preferably 1.3×10/Lc+0.5. The crystallite size Lc is an index representing the thickness of crystallites existing in carbon fibers in the c-axis direction, and is evaluated by wide-angle X-ray diffraction of a fiber bundle mentioned below. Meanwhile, it is also possible to evaluate one single-fiber by microbeam wide-angle X-ray diffraction. In the fiber bundle, wide-angle X-ray diffraction data and single-fiber wide-angle X-ray diffraction data are equivalent. It is generally known that the larger the crystallite size of carbon fibers, the more the single-fiber compressive strength tends to decrease. Formula (1) means that our carbon fiber bundle has a higher single-fiber compressive strength than the value expected from conventional findings with respect to the crystallite size. As a result, it is possible to achieve both the compressive strength and the strand tensile modulus of the carbon fiber-reinforced composite material at a high level. In the carbon fiber bundle, it is possible to obtain the value satisfying the compressive strength of a carbon fiber-reinforced composite material when the right side of formula (1) becomes 1.3× 10/Lc−0.3 or more. The higher the single-fiber compressive strength, the better. When the right side of formula (1) is controlled to 1.3×10/Lc+1.0, more preferably 1.3×10/Lc+ 0.5, and still more preferably 1.3×10/Lc, high effect tends to be obtained.

The "compressive fragmentation method of single-fiber composites" is a method to investigate the single-fiber compressive strength of carbon fibers by counting the number of fiber breaks due to each compressive strain while applying compressive strain stepwise to a carbon fiber-reinforced composite material including the carbon fiber bundle single-fiber embedded in the resin (single-fiber composites). To convert the single-fiber composite compressive strain generated when fibers break into the single-fiber compression strength, there is a need to consider the difference between the single-fiber composite compressive strain and the fiber compressive strain, and the tensile modulus nonlinearity at each fiber compressive strain. The single-fiber compressive stress is obtained by fitting a stress-strain (S-S) curve obtained in a strand tensile test (details will be described later) using a quadratic function with the X axis as the strain and the Y axis as the stress, followed by calculation using the fitting line extended to the compressive strain side. The single-fiber compressive stress at the time when the number of broken fibers exceeds 1/10 mm is defined as the single-fiber compressive strength. To control the carbon fiber bundle to satisfy formula (1), it is required that high tension is applied in a carbonization process as mentioned below, and a heat treatment is performed by taking time until the crystallite size grows at a constant temperature in the carbonization process.

In the carbon fiber bundle, a relationship between the crystallite size Lc and the initial modulus $E_0$ (GPa) in a strand tensile test is satisfied by formula (2):

$$E_0 \leq 80 \times Lc + 155 \tag{2}$$

In the carbon fiber bundle, the relationship of formula (2) is more preferably $E_0 \leq 80 \times Lc + 120$, and still more preferably $E_0 \leq 80 \times Lc + 110$. Generally, the larger the crystallite size of the carbon fiber bundle, the more orientation of crystallites is made uniform so that the initial modulus in the strand tensile test becomes higher. The initial modulus in the strand tensile test measured with the carbon fiber bundle is almost the same as that of the carbon fiber single-fiber. Despite the small crystallite size of the carbon fiber bundle, a carbon fiber bundle having a high initial modulus in the strand tensile test can be produced by applying a large tension in the carbonization process to make orientation of crystallites uniform. However, fuzz (or often referred to as "fuzzes" below) easily increase due to the large tension and deterioration of the quality of the product may cause a problem in high-order processability when the carbon fiber-reinforced composite material is obtained. To prevent such deterioration in quality, it is generally necessary to search for production conditions under which fuzz is unlikely to increase by trial and error.

We found that the initial modulus in the strand tensile test with respect to the crystallite size can be maximized while suppressing fuzz of the carbon fiber bundle by controlling the initial modulus and the crystallite size in the strand tensile test of the carbon fiber bundle to satisfy the relationship of formula (2). The lower limit of the right side of formula (2) is not particularly limited, and when the lower limit is preferably controlled to $80 \times Lc + 60$, more preferably $80 \times Lc + 70$, and still more preferably $80 \times Lc + 80$, it is possible to improve the quality while increasing the initial modulus in the strand tensile test.

The initial modulus $E_0$ in the strand tensile test is defined as a coefficient b of a primary term when fitting an S-S curve obtained in a strand tensile test of the carbon fiber bundle using a quadratic function $y = ax^2 + bx + c$ with x as the strain and y as the stress (GPa) in a range of $0 \leq y \leq 3$. To control the carbon fiber bundle to satisfy formula (2), it is required that high tension is applied in a carbonization process mentioned below, and a heat treatment is performed by taking time until the crystallite size grows at a constant temperature. It is also possible to evaluate Lc and $E_0$ from the single-fiber by the method mentioned below.

In the carbon fiber bundle, a relationship of the initial modulus $E_0$ (GPa) in the strand tensile test is satisfied by formula (3):

$$E_0 \geq 330 \tag{3}$$

In the carbon fiber bundle, formula (3) is preferably $E_0 \geq 340$, and more preferably $E_0 \geq 350$. When the initial modulus of the carbon fiber bundle in the strand tensile test is 330 GPa or more, the tensile modulus of the carbon fiber-reinforced composite material thus obtained increases, which is preferable. Although $E_0$ is preferably as high as possible, the right side of formula (3) is controlled so that the upper limit is preferably 450, more preferably 400, and still more preferably 380. In general, as the initial modulus in the strand tension test increases, the single-fiber compressive strength often decreases, but the carbon fiber bundle has sufficient compressive strength for practical purposes even when the initial modulus in the strand tensile test is 330 GPa or more. The initial modulus in the strand tensile test can be evaluated from the S-S curve obtained from the strand tensile test of the carbon fiber bundles as mentioned above. To control the carbon fiber bundle to satisfy formula (3), it is necessary to increase the degree of orientation of polyacrylonitrile-based precursor fibers, apply high tension to the fiber bundle in a pre-carbonization process and a carbonization process mentioned below, increase the maximum temperature of the carbonization process, and increase the heat treatment time of the carbonization process.

The carbon fiber bundle has a crystallite size Lc of preferably 2.60 nm or more, more preferably 2.85 nm or more, and still more preferably 3.00 nm or more. If Lc is 2.60 nm or more, it is easy to satisfy both the compressive strength of the carbon fiber bundle and the initial modulus in the strand tensile test. If Lc is 2.85 nm or more, it is possible to achieve higher industrial value from the viewpoint of the initial modulus. The upper limit of Lc in the carbon fiber bundle is 4.00 nm. If Lc is too large, the compressive strength of the single-fiber compressive strength may decrease and high-order processability may deteriorate, for example, fuzz may easily occur. It is possible to suppress deterioration of these properties by setting the upper limit of Lc at 4.00 nm or less. Lc is preferably 3.80 nm or less, and more preferably 3.60 nm or less. In general, the single-fiber compressive strength tends to decrease as the crystallite size of carbon fibers increases, but the carbon fiber bundle has both high crystallite size and single-fiber compressive strength. Since high high-order processability can be maintained, it is possible to obtain the effect of achieving both the tensile modulus and the compressive strength of carbon fiber reinforced composites, which is a desired effect. Examples of the method of controlling the crystallite size of the carbon fiber bundle in the above range include increasing the maximum temperature of the carbonization process, increasing the heat treatment time of the carbonization process and the like.

In the carbon fiber bundle, the number of fuzzes existing in the carbon fiber bundle is preferably 2/m or less, more preferably 1.0/m or less, and still more preferably 0.5/m or less. When the number of fuzzes existing in the carbon fiber bundle increases, the high-order processability of the carbon fiber-reinforced composite material deteriorates, and when the carbon fiber-reinforced composite material is formed, the part where fibers are broken by the compression stress may become a fracture starting point, leading to a decrease in compressive strength of the carbon fiber-reinforced composite material. When the number of fuzzes in the carbon fiber bundle is 2/m or less, the higher-order processability and the compressive strength of the carbon fiber-reinforced composite material tend to be kept at satisfactory values. The number of fuzzes is calculated by counting the number of furballs/fuzzes while running the carbon fiber bundle at a speed of 1 m/min for 10 m in one line, followed by conversion into the number thereof per 1 m. Examples of the method of controlling the number of fuzzes existing per 1 m of the carbon fiber bundle in the above range include reducing the application of tension in the carbonization process mentioned below.

The carbon fiber bundle has an average tearable length of preferably 800 to 1,100 mm, more preferably 850 to 1,050 mm, and still more preferably 900 to 1,000 mm. When the average tearable length is 800 mm or more, the carbon fiber bundle is sufficiently opened during the production of the carbon fiber-reinforced composite material and a matrix resin is easily impregnated into the space between single-fibers, leading to uniform stress transfer in the carbon fiber-reinforced composites, thus making it possible to increase the compressive strength of the carbon fiber-reinforced composites. There is no particular limitation on the upper limit of the average tearable length of the carbon fiber bundle, and sufficient effect tends to be obtained if the upper limit is 1,100 mm or less. The details of the method of measuring the average tearable length can be evaluated by the method mentioned below. It is possible to use, as means of controlling the average tearable length in the above range, any method as long as the above numerical range can be achieved. It is preferable that the average tearable length of the pre-carbonized fiber bundle is controlled to 500 to 800 mm. For that purpose, it is preferable to perform a fluid interlacing treatment in any one of the production process of the polyacrylonitrile-based precursor fiber and the stabilization process, namely, in the place where the fiber bundle having a fiber elongation of 5% or more is processed.

The carbon fiber bundle has a strand tensile strength of preferably 3.5 GPa or more, more preferably 4.0 GPa or more, still more preferably 4.8 GPa or more, yet more preferably 5.2 GPa or more, and particularly preferably 5.6 GPa or more. From the viewpoint of increasing the tensile elongation of the obtained carbon fiber-reinforced composite material, it is preferable to increase the strand tensile strength. If the strand tensile strength is 3.5 GPa or more, the tensile elongation of the obtained carbon fiber-reinforced composite material tends to be industrially significant. When the strand tensile strength is low even if the single-fiber compressive strength of the carbon fiber bundle is high, the outside of the bend where a tensile load acts may cause final fracture when bending deformation is applied to the obtained carbon fiber-reinforced composite material. If the strand tensile strength of the carbon fiber bundle is 4.8 GPa or more, the carbon fiber bundle is well balanced with high single-fiber compressive strength so that it is easy to sufficiently maintain the compressive strength of the obtained carbon fiber-reinforced composite material. Although the strand tensile strength is preferably as high as possible, it is preferably 9.0 GPa or less, more preferably 8.7 GPa or less, and still more preferably 8.5 GPa or less, from the viewpoint of the balance with single-fiber compressive strength. The strand tensile strength can be evaluated by a strand tensile test mentioned below. To keep the strand tensile strength in the above range, it is important to oxidize the polyacrylonitrile-based precursor fiber bundle while controlling parameters of infrared spectrum, and pre-carbonize and carbonize the stabilized fiber bundle.

In the carbon fiber bundle, it is preferable that a single-fiber diameter is 5.0 μm or more and a relationship between a crystallite size Lc (nm) and a specific gravity SG determined by the Archimedean method satisfies formulas (4) and (5). Each formula will be described below:

$$SG \geq 0.0633 \times Lc + 1.565 \qquad (4)$$

$$2.85 \leq Lc \leq 4.00 \qquad (5).$$

In the carbon fiber bundle, the specific gravity SG is preferably $0.0633 \times Lc+1.565$ or more, more preferably $0.0633 \times Lc+1.567$ or more, and still more preferably $0.0633 \times Lc+1.569$ or more. In general, the larger the crystallite size of the carbon fiber bundle, the more the single-fiber compressive strength tends to decrease. We found that a carbon fiber bundle having high single-fiber compressive strength with respect to the crystallite size is obtained by controlling the specific gravity in formula (4) with respect to the crystallite size. Although the reason is not clear, we believe that buckling of crystallites causes compressive failure in carbon fibers so that it is presumed that formation of a structure having high specific gravity, i.e., a dense structure increases the compressive stress required to buckle the crystallites. To control a relationship between the crystallite size and the specific gravity in formula (4), it is effective that a heat treatment is performed by taking time in a carbonization process mentioned below.

In the carbon fiber bundle, it is preferable that the specific gravity SG satisfies formula (4) and the crystallite size Lc is in a range of 2.85 nm or more and 4.00 nm or less shown by formula (5). The reason why the crystallite size preferably satisfies such a range, and the control method therefor are as mentioned above.

The single-fiber diameter of the carbon fiber bundle is preferably 5.0 μm or more, more preferably 6.0 μm or more, still more preferably 6.5 μm or more, yet more preferably 6.9 μm or more, and most preferably 7.2 μm or more. The single-fiber diameter is evaluated by observing using a scanning electron microscope. If the cross-sectional shape of the single-fiber is not a perfect circle, an equivalent circle diameter is substituted for the diameter. The equivalent circle diameter refers to the diameter of a perfect circle having a cross-sectional area equal to the measured cross-sectional area of the single-fiber. If the single-fiber diameter is 5.0 μm or more, impregnation of the resin into the fiber bundle during molding of the composite material is easily enhanced, and a high-quality composite material with few voids is easily obtained. As a result, it is easy to increase the tensile modulus of the obtained composite material. If the single-fiber diameter is 6.0 μm or more, the single-fiber is less likely to buckle so that the compressive strength of the single-fiber is easily increased. There is no particular limitation on the upper limit of the single-fiber diameter, and the upper limit is about 15 μm for production reasons. The single-fiber diameter may be controlled by a known method, for example, the amount of a precursor polymer extruded from a spinneret during spinning of a bundle of precursor fibers for carbon fibers, and the stretching ratio in each process.

The prepreg includes the carbon fiber bundle impregnated with a thermosetting resin. The thermosetting resin is preferably a thermosetting resin, a cured product of which has a tensile modulus of preferably 3.0 GPa or more, more preferably 3.2 GPa or more, and still more preferably 3.5 GPa or more. When the cured product of the thermosetting resin has high tensile modulus, it is possible to sufficiently exhibit the single-fiber compressive strength of the carbon fiber bundle in the obtained carbon fiber-reinforced composite material, thus making it possible to increase the compressive strength of the entire carbon fiber-reinforced composite material. If the tensile modulus of the cured product of the thermosetting resin is 3.0 GPa or more, it is possible to satisfy the value of the compressive strength of the carbon fiber-reinforced composite material. Although the tensile modulus of the cured product of the thermosetting resin is preferably as high as possible, it is sufficiently 7.0 GPa, more preferably 6.7 GPa, and still more preferably 6.5 GPa. The type of the thermosetting resin is not particularly limited, and examples thereof include an epoxy resin, a vinyl ester resin, a phenol resin, a benzoxazine resin, a bismaleimide resin, a cyanate ester resin, a polyimide resin and the like. Of these, the epoxy resin is preferable from the viewpoint of excellent handleability and curability in the state before curing.

Examples of the epoxy resin include a bisphenol A type epoxy resin, a bisphenol F type epoxy resin, a bisphenol S type epoxy resin, a biphenyl type epoxy resin, a naphthalene type epoxy resin, a novolac type epoxy resin, an epoxy resin having a fluorene skeleton, an epoxy resin made from a copolymer of a phenol compound and dicyclopentadiene as a raw material, a glycidyl ether type epoxy resin such as diglycidyl resorcinol, tetrakis(glycidyloxyphenyl)ethane or tris(glycidyloxyphenyl)methane, and a glycidyl amine type epoxy resin such as tetraglycidyl-diaminodiphenylmethane, triglycidylaminophenol, triglycidylaminocresol or tetraglycidylxylenediamine. These epoxy resins may be used alone or plural types thereof may be used in combination.

The curing agent of the epoxy resin is not particularly limited as long as it causes the epoxy resin to cure, and examples thereof include amines such as aromatic amine and alicyclic amine, acid anhydrides, polyaminoamides, organic acid hydrazides, isocyanates and the like. The amine curing agent is preferable because the obtained resin cured product has excellent mechanical properties and heat resistance. It is possible to use, as the amine curing agent, aromatic amines such as diaminodiphenyl sulfone and diaminodiphenylmethane, aliphatic amines such as dicyandiamide or derivatives thereof, a hydrazide compound and the like.

The curing agent may be used in combination with a curing accelerator. Examples of the curing accelerator to be used in combination include ureas, imidazoles, Lewis acid catalysts and the like. Of these, the urea compound is preferably used in view of the balance between the storage stability and the catalytic ability. It is possible to use, as the urea compound, N,N-dimethyl-N'-(3,4-dichlorophenyl) urea, toluenebis(dimethylurea), 4,4'-methylenebis(phenyldimethylurea), 3-phenyl-1,1-dimethylurea and the like.

The prepreg includes a carbon fiber bundle and a thermosetting resin. Such a prepreg can be obtained by impregnating the carbon fiber bundle with the thermosetting resin. Examples of the method of impregnation include a wet method and a hot melt method (dry method).

The wet method is a method in which a carbon fiber bundle is immersed in a solution prepared by dissolving a thermosetting resin in a solvent such as methyl ethyl ketone or methanol and, after pulling up the carbon fiber bundle, the solvent is evaporated from the carbon fiber bundle using an oven or the like, thus impregnating the carbon fiber bundle with an epoxy resin composition. The hot melt method is a method in which a carbon fiber bundle is directly impregnated with a thermosetting resin having a viscosity reduced by heating, or a method in which, after fabricating a film by coating a thermosetting resin on a release paper, the film is laminated from both sides or one side of the carbon fiber bundle and then heat and pressure are applied, thus impregnating the carbon fiber bundle with the resin. Only one carbon fiber bundle may be used, or a plurality of carbon fiber bundles may be used in an aligned state.

The carbon fiber-reinforced composite material is a composite material including the above carbon fiber bundle and matrix resin. It is possible to use, as the matrix resin, a cured product of a thermosetting resin, a thermoplastic resin, or a mixture thereof. When the thermosetting resin is used, the composite material may be produced via the above prepreg. In that example, as mentioned above, it is preferable to use a thermosetting resin, a cured product of which has an tensile modulus of 3.0 GPa or more from the viewpoint of increasing the compressive strength of the carbon fiber-reinforced composite material. The type of the thermosetting resin is not particularly limited, and the thermosetting resin can be appropriately used in combination with those mentioned above.

Next, a method of producing a carbon fiber bundle will be described.

In the production of the carbon fiber bundle, first, a polyacrylonitrile-based precursor fiber bundle is produced. A polyacrylonitrile copolymer is preferably used as a raw material used to produce the polyacrylonitrile precursor fiber bundle. The polyacrylonitrile copolymer refers to those in which at least acrylonitrile is a main constituent component of the copolymer. The main constituent component usually refers to a constituent component which accounts for 90 to 100% by mass of the polymer. As a monomer which can be used as a copolymerization component, a monomer having one or more carboxylic acid groups or amide groups is preferably used from the viewpoint of promoting oxidization. Examples of the monomer having carboxylic acid groups include acrylic acid, methacrylic acid, itaconic acid and alkali metal salts thereof, and ammonium salts. Examples of the monomer having amide groups include acrylamide.

In the method of producing a polyacrylonitrile-based precursor fiber bundle, the method of producing a polyacrylonitrile copolymer can be selected from known polymerization methods.

In the production of the polyacrylonitrile-based precursor fiber bundle, either a dry-wet spinning method or a wet spinning method may be used as a fiber manufacturing method, but the dry-wet spinning method advantageous for the strand tensile strength of the obtained carbon fiber bundle is preferably used. fiber manufacturing process comprises a spinning process of spinning by extruding a spinning dope solution from a spinneret into a coagulation bath, a water washing process of washing the fibers obtained in the spinning process in a water bath, a water bath stretching process of stretching the fiber bundle obtained in the water washing process in a water bath, a dry heat treatment process of subjecting the fiber bundle obtained in the water bath stretching process to a dry heat treatment and, if necessary, a steam stretching process of steam stretching the fiber bundle obtained in the dry heat treatment. The order of each process can be changed as appropriate.

The spinning dope solution is prepared by dissolving the above polyacrylonitrile copolymer in a solvent in which the polyacrylonitrile copolymer is soluble. Examples of the solvent in which the polyacrylonitrile copolymer is soluble include organic solvents such as dimethyl sulfoxide, dimethylformamide and dimethylacetamide, and aqueous solutions of nitric acid, zinc chloride and sodium rhodanide.

It is preferable that a solvent such as dimethyl sulfoxide, dimethylformamide and dimethylacetamide used as a solvent for the spinning dope solution, and a coagulation promoting component are included in the coagulation bath. It is possible to use, as the coagulation promoting component, a component that does not dissolve the polyacrylonitrile copolymer and is compatible with the solvent used in the spinning solution. Specifically, it is preferable to use water as the coagulation promoting component.

It is preferable to use, as the water washing bath in the water washing process, a water washing bath including a plurality of stages at a temperature of 30 to 98° C. The stretching ratio in the water bath stretching process is preferably 2 to 6 times.

After the water bath stretching process, it is preferable to apply an oil agent made of silicone to the fiber bundle for the purpose of preventing adhesion between single-fibers. It is preferable to use a modified silicone as the silicone oil agent, and those containing an amino-modified silicone having high heat resistance are preferably used.

A known method can be used for the dry heat treatment process. For example, the drying temperature is 100 to 200° C.

After the dry heat treatment process, an interlacing treatment with a fluid to the fiber bundle is preferably used. The fluid used in the fluid interlacing treatment may be either a gas or a liquid, and the preferred is the use of air or nitrogen in view of low cost. In the fluid interlacing treatment, the fluid is preferably sprayed onto the fiber bundle by using a nozzle, and the shape of the nozzle used in spraying the fluid is not particularly limited while the one having 2 to 8 ejection orifices is preferable. While the arrangement of the ejection orifices are not particularly limited, even-numbered ejection orifices are preferably arranged around the fiber bundle so that the longitudinal direction of the fiber bundle and the spray direction of the fluid are at an angle of 88° to 90° and each ejection orifice faces with another ejection orifice at opposite sides of the fiber bundle forming an ejection orifice pair.

After the above water washing process, water bath stretching process, oil agent applying process and dry heat treatment process, steam stretching is optionally performed to obtain a polyacrylonitrile-based precursor fiber bundle suitable for obtaining the carbon fiber bundle. The steam stretching is preferably performed in pressurized steam at a stretching ratio of 2 to 6 times.

The single-fiber fineness of the polyacrylonitrile-based precursor fiber bundle is preferably 0.5 to 1.5 dtex, more preferably 0.7 to 1.5 dtex, and still more preferably 0.9 to 1.5 dtex, from the viewpoint of increasing the strand tensile strength of the carbon fiber bundle.

In the method of producing a carbon fiber bundle, the polyacrylonitrile-based precursor fiber bundle is subjected to a stabilization process, a pre-carbonization process and a carbonization process to obtain a carbon fiber bundle.

The stabilization process refers to a process of subjecting the polyacrylonitrile-based precursor fiber bundle to a heat treatment at 200 to 300° C. in an atmosphere containing oxygen. In the method of producing a carbon fiber bundle, to increase the initial modulus and the single-fiber compressive strength in the strand tensile test of the carbon fiber bundle, particularly when the polyacrylonitrile-based precursor fiber bundle is subjected to the stabilization process, it is preferable to control a ratio of a peak intensity at 1,453 $cm^{-1}$ to a peak intensity at 1,370 $cm^{-1}$ in an infrared spectrum of the obtained stabilized fiber bundle to be 0.60 to 0.70, and a ratio of a peak intensity at 1,254 $cm^{-1}$ to a peak intensity at 1,370 $cm^{-1}$ in an infrared spectrum to be 0.50 to 0.65. The peak at 1,453 $cm^{-1}$ in the infrared spectrum is a peak derived from an alkene, and decreases with the progress of stabilization reaction. The peak at 1,370 $cm^{-1}$ and the peak at 1,254 $cm^{-1}$ are peaks derived from the stabilized structure (that are considered to be a naphthyridine ring structure and a hydrogenated naphthyridine ring structure, respectively) and increase with the progress of the stabilization reaction. In the stabilization process, it is common to reduce the peak derived from polyacrylonitrile as much as possible to increase a carbonization yield. However, the conditions of the stabilization process are deliberately set to leave a large amount of alkenes. We found that subjecting the stabilized fibers having such a structure to the pre-carbonization process exerts the effect of increasing the initial modulus and the single-fiber compressive strength in the strand tensile test of the obtained carbon fiber bundle. It is important to set the stabilization conditions so that the ratio of the peak intensity at 1,254 $cm^{-1}$ to the peak intensity at 1,370 $cm^{-1}$ is 0.50 to 0.65. The peak intensity as mentioned herein is an absorbance at each wavelength after baseline correction of the spectrum obtained by measuring the infrared spectrum after sampling a small amount of stabilized fiber, and no particular peak division is performed. The concentration of the sample is measured after being diluted with KBr to be 0.67% by mass. To control the infrared spectrum of the stabilized fibers in the above range, the production conditions may be examined according to a suitable production method mentioned below.

The treatment time of the stabilization process can be appropriately selected to preferably 10 to 100 minutes. For the purpose of improving the initial modulus and the single-fiber compressive strength in the strand tensile test of the obtained carbon fiber bundle, the treatment time of the stabilization process is set so that the specific gravity of the obtained stabilized fiber is preferably 1.30 to 1.36, and more preferably 1.31 to 1.35. More preferable stabilization treatment time depends on the stabilization temperature. If the specific gravity of the stabilized fiber is 1.30 or more, physical properties such as the strand tensile modulus of the carbon fiber bundle can be sufficiently exhibited, and if the specific gravity is 1.36 or less, the single-fiber compressive strength can be increased. The specific gravity of the stabilized fiber is controlled by the stabilization treatment time and the stabilization temperature. To oxidize the polyacrylonitrile-based precursor fiber, it is preferable to control the stabilization temperature so that the peak intensity ratio of the infrared spectrum falls in the above range. Specifically, the stabilization temperature is preferably controlled in the air at 200 to 300° C., more preferably 210 to 280° C., and still more preferably 220 to 280° C. The preferred range of the stabilization treatment time and the stabilization temperature vary depending on properties of the polyacrylonitrile-based precursor fiber bundle and the copolymerization composition of the polyacrylonitrile copolymer.

When the twisted fiber bundle is used in the carbonization process, the tension of the fiber bundle in the stabilization process is set at 1.0 mN/dtex or more. The tension is preferably 1.2 mN/dtex or more, and more preferably 1.4 mN/dtex or more. The tension of the fiber bundle in the stabilization process is obtained by dividing the tension (mN) of the fiber bundle measured on the stabilization furnace outlet side by the total fineness (dtex) which is the product of the single-fiber fineness (dtex) of the bundle of precursor fibers for carbon fibers used and the number of filaments. By controlling the tension, the degree of crystal orientation of the stabilized fiber bundle is easily increased, and when the tension is applied to the fiber bundle in the subsequent carbonization process, the tensile modulus of the obtained carbon fibers easily increases so that it is easy to obtain a carbon fiber bundle having an excellent balance with the compressive strength. If the tension of the fiber bundle in the stabilization process is 1.0 mN/dtex or more, the degree of crystal orientation of the stabilized fiber bundle can be sufficiently increased.

In the pre-carbonization process of pre-carbonizing the fiber bundle obtained in the stabilization process, the obtained stabilized fiber is subjected to a heat treatment at a maximum temperature of 500 to 1,000° C. in an inert atmosphere. If the maximum temperature of the pre-carbonization temperature is 500° C. or higher, the pre-carbonized fiber bundle can be carbonized in the subsequent carbonization process without breaking due to thermal decomposition. There is no particular limitation on the upper limit to the maximum temperature of the preliminary carbonization temperature, but it is preferably 1,000° C. or lower to keep the temperature below the carbonization temperature in the subsequent carbonization process.

In the carbonization process of carbonizing the pre-carbonized fiber bundle, the obtained pre-carbonized fiber bundle is subjected to a heat treatment in an inert atmosphere at a maximum temperature T of 1,700 to 3,000° C. The maximum temperature is preferably 1,700 to 2,900° C., and more preferably 1,900 to 2,800° C. In general, the higher the maximum temperature in the carbonization process, the larger the crystallite size and the more orientation of crystallites is made uniform so that the initial modulus in the strand tensile test of the obtained carbon fiber bundle is improved, while the single-fiber compressive strength of the carbon fiber bundle decreases. If the carbonization temperature is 1,700° C., it is the temperature enough to sufficiently progress carbonization to increase the crystallite size, and if it is 3,000° C. or lower, it is the temperature enough to maintain the single-fiber compressive strength of the carbon fiber bundle.

In the carbonization process of carbonizing the pre-carbonized fiber bundle, when a substantially not twisted fiber bundle is used, the obtained pre-carbonized fiber bundle is carbonized in an inert atmosphere until a relationship between the crystallite size Lc (nm) and the maximum temperature T (° C.) satisfies: $Lc \geq 2.00 \times 10^{-3} \times T - 0.90$. "Substantially not twisted" means that, although no twist exists in the fiber bundle or twist is locally present, S-twist and Z-twist equally exist and the number of net twist in the entire carbonization process is less than 1 turn/m. By using a substantially not twisted fiber bundle, it becomes easy to widen the fiber bundle when forming a carbon fiber-reinforced composite material, and it is easy to obtain a high-quality prepreg and a carbon fiber-reinforced composite material. The condition is preferably $Lc \geq 2.00 \times 10^{-3} \times T - 0.87$, and still more preferably $Lc \geq 2.00 \times 10^{-3} \times T - 0.83$. The upper limit of Lc is not particularly limited, but if it is too large, the single-fiber compressive strength may decrease so that the following relationships $Lc \leq 2.00 \times 10^{-3} \times T - 0.50$, preferably $Lc \leq 2.00 \times 10^{-3} \times T - 0.60$, and more preferably $Lc \leq 2.00 \times 10^{-3} \times T - 0.70$ can satisfy the single-fiber compressive strength of the carbon fiber bundle. In general, the higher the crystallite size of carbon fibers, the lower the single-fiber compressive strength tends to decrease, and the carbon fiber bundle shows that both the crystallite size and the single-fiber compressive strength are high. As a result, it is possible to efficiently obtain the effect of achieving both the tensile modulus and the compressive strength of the carbon fiber-reinforced composite material, which is a desired effect. When $Lc \geq 2.00 \times 10^{-3} \times T - 0.90$ is satisfied, the initial modulus in the strand tensile test and the single-fiber compressive strength can be compatible at a high level. To improve the crystallite size, it is sufficient to raise the carbonization temperature, but just increasing the carbonization temperature lowers the single-fiber compressive strength of the carbon fiber bundle. To improve the crystallite size without lowering the single-fiber compressive strength, the retention time at the maximum temperature in the carbonization process may be lengthened. The relationship between the retention time and the crystallite size is basically a linear relationship, and the retention time can be selected by extrapolating the relational expression between the retention time and the crystallite size.

When a non-twisted fiber bundle is used in the carbonization process of carbonizing the pre-carbonized fiber bundle, carbonization is performed while controlling the tension to 4.0 to 6.0 mN/dtex. The tension in the carbonization process is preferably 4.5 to 6.0 mN/dtex, and more preferably 4.5 to 5.5 mN/dtex. By carbonizing while applying the tension in the carbonization process, orientation of crystallites can be made uniform, thus improving the initial modulus in the strand tensile test of the obtained carbon fiber bundle. If the tension is 4.0 mN/dtex or more, the initial modulus in the strand tensile test of the carbon fiber bundle is sufficiently exhibited, and if the tension is 6.0 mN/dtex or less, the generation of fuzzes in the carbonization process can be suppressed even when substantially not twisted fiber bundle is used. In the carbonization process, there is a need to apply the tension while maintaining the maximum temperature and the retention time at the maximum temperature. When the maximum temperature in the carbonization process is low or the retention time at the maximum temperature is short, the initial modulus in the strand tensile test of the obtained carbon bundle decreases. When the tension in the carbonization process is increased to increase the initial modulus, fuzz is generated and wound around a roller, leading to significant deterioration of the productivity. Further, if the tension in the carbonization process is low, the initial modulus in the strand tensile test of the obtained carbon fiber bundle will be low. If the maximum temperature in the carbonization process or the retention time at the maximum temperature is increased to increase the initial modulus, the single-fiber compressive strength of the carbon fiber bundle decreases. The tension in the carbonization process is measured by sandwiching the running carbon fiber bundle immediately after coming out of a heating furnace in the carbonization process using a tensiometer. The tension can be adjusted by controlling the speed of the roller before and after the carbonization process.

When a twisted fiber bundle is used in the carbonization process of carbonizing the pre-carbonized fiber bundle, the number of twists in all processes during passing through the carbonization process is controlled to 2 turns/m or more. The number of twists is preferably 5 turns/m or more, more preferably 16 turns/m or more, still more preferably 20 turns/m or more, yet more preferably 31 turns/m or more, and particularly preferably 46 turns/m or more. The twist number is preferably 120 turns/m or less, and more preferably 80 turns/m or less. By controlling the number of twists to 2 turns/m or more, fuzzes during the carbonization process is suppressed so that it is possible to apply higher tension than in no twisting, and the tensile modulus of the obtained carbon fiber bundle easily increases. As the number of twists increases, the axial direction of the single-fibers in the fiber bundle inclines with respect to the tensile direction of the fiber bundle, and fuzz during the carbonization process may occur rather easily. If the number is controlled to 120 turns/m or less, generation of fuzz can be suppressed to such an extent that there is no problem in the process. The number of twists of the fiber bundle in the carbonization process means the number of twists in all the processes of applying a heat treatment in the carbonization process, and the carbonization process is performed in a state where the fiber bundle before subjecting to the carbonization process has a twist of 2 turns/m or more. When the tension in the carbonization process is increased without twisting, single-fiber breakage occurs and the number of fuzzes increases so that the passability of the carbonization process may deteriorate or the entire fiber bundle may breaks, thus failing to maintain requisite tension. The number of twists can be controlled by a method in which a bundle of precursor fibers for carbon fibers or a stabilized fiber bundle or a pre-carbonized fiber bundle is once wound around a bobbin, and when the fiber bundle is unwound, the bobbin is rotated to a surface orthogonal to the unwinding direction of the bobbin, or a method of twisting by bringing a rotating roller or belt into contact with a running fiber bundle without being wound on a bobbin. Although there is no clear upper limit on the number of twists, about 500 turns/m may be considered as a practical upper limit in view of the processability.

When a twisted fiber bundle is used in the carbonization process of carbonizing the pre-carbonized fiber bundle, the surface layer 4 of the fiber bundle in all the processes during passing through the carbonization process is controlled to 0.2° or more. The twist angle is preferably 0.7° or more, more preferably 2.0° or more, and still more preferably 2.5° or more. The twist angle is preferably 41.5° or less, more preferably 30.5° or less, still more preferably 24.0° or less, and particularly preferably 12.5° or less. By controlling the twist angle to 0.2° or more, fuzz during the carbonization process are suppressed so that it becomes possible to apply higher tension than in no twisting, and the tensile modulus of the obtained carbon fiber bundle easily increases. As the twist angle increases, the axial direction of the single-fibers in the fiber bundle inclines with respect to the tensile direction of the fiber bundle, and fuzz during the carbonization process may occur rather easily. If the twist angle is controlled to 41.5° or less, generation of fuzz can be suppressed to such an extent that there is no problem in the process. The twist angle of the fiber bundle in the carbonization process can be calculated from the number of twists and the number of filaments of the fiber bundle and the diameter of the single-fiber as mentioned below. Although there is no clear upper limit on the twist angle, it may be considered that about 52.5° is a practical upper limit in view of the processability.

When a twisted fiber bundle is used in the carbonization process of carbonizing the pre-carbonized fiber bundle, it is carbonized while controlling the tension to 4.0 mN/dtex or more. The tension in the carbonization process is preferably 4.5 mN/dtex or more, more preferably 5.0 mN/dtex, and still more preferably 7.0 mN/dtex. By carbonizing while applying tension in the carbonization process, orientation of the crystallites can be made uniform, and the initial modulus in the strand tensile test of the obtained carbon fiber bundle is improved. If it is 4.0 mN/dtex or more, the initial modulus in the strand tensile test of the carbon fiber bundle is sufficiently exhibited, and when a twisted fiber bundle is used, even if it is 6.0 mN/dtex or more, generation of fuzz in the carbonization process can be suppressed and a high tension can be applied so that orientation of the crystallites can be easily made uniform, and it is easy to obtain a carbon fiber bundle having an excellent balance between the strand tensile modulus and the compressive strength.

The carbon fiber bundle thus obtained is preferably subjected to an oxidation treatment. By the oxidation treatment, an oxygen-containing functional group is introduced into the carbon fiber bundle. It is possible to use, as the oxidation treatment, vapor phase oxidation, liquid phase oxidation and liquid phase electrolytic oxidation. From the viewpoint of high productivity and capability of performing uniform treatment, liquid phase electrolytic oxidation is preferably used. There is no particular limitation on the liquid phase electrolytic oxidation method, and a known method may be used.

After the liquid phase electrolytic oxidation, a sizing agent can also be applied to provide converging properties to the obtained carbon fiber bundle. As for the sizing agent, a sizing agent having good compatibility with the matrix resin can be selected as appropriate depending on the type of the matrix resin used in the composite material.

The methods of measuring various physical properties are as follows.

Method of Measuring Average Tearable Length

The method of measuring a tearable length is shown in FIG. 1. First, a fiber bundle 1 is cut to a length of 1,160 mm, and one end is fixed on a horizontal table with an adhesive tape so that this end is not movable. This point (2) is designated as a fixed point A. The other non-fixed end of the fiber bundle is divided into two bundles by finger, and one bundle is secured to the table with an adhesive tape in tightly stretched state. This point (3) is designated as a fixed point B. The other end of the divided bundle is pivoted on the table with no slack around the fixed point A, and this end is stopped at position where the distance in a straight line from the fixed point B is 500 mm and fixed on the table with an adhesive tape. This point (4) is designated as a fixed point C. The area surrounded by the fixed points A, B, and C is visually observed, and after finding interlacing point 5 farthest from the fixed point A, length projected onto the straight line between the fixed point A and the fixed point B is read by using a ruler with minimum scale of 1 mm. This length is designated the tearable length 6. This measurement is repeated 30 times, and the arithmetic mean value of the measurement is used as the average tearable length. In this measurement method, the interlacing point 5 farthest from the fixed point A is the point which is farthest from the fixed point A in straight line distance where three or more single-fibers with no slacking are interlaced with each other.

Intension Ratio of Infrared Spectrum

After freezing and pulverizing a stabilized fiber to be measured, 2 mg of the pulverized fiber is precisely weighed and collected, followed by mixing well with 300 mg of KBr. The mixture thus obtained is placed in a molding jig and then pressurized at 40 MPa for 2 minutes using a press machine to fabricate a tablet for measurement. The tablet thus obtained is installed in a Fourier transform infrared spectrophotometer to measure a spectrum in a range of 1,000 to 2,000 $cm^{-1}$. Background correction is performed by reducing a minimum value in the range of 1,700 to 2,000 $cm^{-1}$ from each intensity so that the minimum value becomes "0." In Examples and Comparative Examples mentioned below, PARAGON 1000 manufactured by Perkin Elmer Co., Ltd., was used as the Fourier transform infrared spectrophotometer.

Strand Tensile Test of Carbon Fiber Bundle

The strand tensile modulus of the carbon fiber bundle and the strand tensile strength are determined in accordance with "Strand Test Method" defined in JIS R7608 (2008). The initial modulus $E_0$ in the strand tensile test is defined as a coefficient b of a primary term when fitting an S-S curve obtained in a strand tensile test using a quadratic function $y=ax^2+bx+c$ with x as the strain and y as the stress (GPa) in a range of $0 \leq y \leq 3$. Strain is measured by using an extensometer. The number of strands to be measured was seven, and arithmetic average values of the measurement results are defined as the initial modulus $E_0$ and the strand tensile strength of the carbon fiber bundle. In the Examples and Comparative Examples mentioned below, test pieces were fabricated in the following manner. The test pieces were fabricated by impregnating a carbon fiber bundle with the following resin composition, followed by curing by subjecting to a heat treatment at 130° C. for 35 minutes.

Resin Composition
3,4-Epoxycyclohexylmethyl-3,4-epoxy-cyclohexane-carboxylate (100 parts by mass) Boron trifluoride monoethylamine (3 parts by mass) Acetone (4 parts by mass).

In Examples and Comparative Examples mentioned below, CELLOXIDE P2021P (manufactured by Daicel Corporation) was used as the above 3,4-epoxycyclohexylmethyl-3,4-epoxy-cyclohexane-carboxylate.

Specific Gravity of Carbon Fiber Bundle

After sampling 1 m of the carbon fiber bundle to be measured, the specific gravity is measured by the Archimedean method using o-dichloroethylene as a specific gravity liquid. The measurement is performed in a constant temperature environment at room temperature of 25° C., and the number of sample is 3 and an average thereof is employed.

Single-Fiber Compressive Strength of Carbon Fibers

The single-fiber compressive strength measured by the compressive fragmentation method of single-fiber composites is measured by procedures (1) to (5).

(1) Preparation of Resin

In a container, 190 parts by mass of a bisphenol A type epoxy resin compound "EPOTOHTO (registered trademark)" YD-128 (manufactured by Nippon Steel Chemical Co., Ltd.) and 20.7 parts by mass of diethylenetriamine (manufactured by Wako Pure Chemical Industries, Ltd.) are charged, followed by mixing using a spatula and further defoaming using an automatic vacuum defoaming device.

(2) Sampling of Carbon Fiber Single-Fiber and Fixation to Mold

A carbon fiber bundle having a length of about 20 cm is substantially equally divided into four bundles and single-fibers are sampled in order from four bundles. At this time, the fibers are sampled as evenly as possible from the entire bundles. Next, a double-sided tape is applied to both ends of perforated backing paper, and the sampled single-fibers are fixed onto the perforated backing paper in a state where a constant tension is applied to the single-fibers. Next, a glass plate with a polyester film "LUMIRROR (registered trademark)" (manufactured by Toray Industries, Inc.) attached thereon is prepared, and a spacer having a thickness of 2 mm to adjust the thickness of a test piece is fixed onto the film. The perforated backing paper with the single-fibers fixed thereon is placed on the spacer and, additionally, a glass plate with the film similarly attached thereon is set on the backing paper such that a side thereof with the film attached thereon faces downward. At this time, to control an embedment depth of the fibers, a tape having a thickness of about 70 μm is attached to both ends of the film.

(3) Casting to Curing of Resin

The resin prepared by the procedure of the above (2) was cast in the mold (the space surrounded by the spacer and the films) prepared by the procedure of the above (1). The mold having the resin cast therein was heated for 5 hours using an oven preheated to 50° C., and the temperature was then fallen to 30° C. at a temperature falling rate of 2.5° C./minute. After releasing from the mold and cutting, a test piece of 2 cm×7.5 cm×0.2 cm is obtained. The test piece is cut so that the single-fibers are located in the area having a width of 0.5 cm at the center in the width direction of the test piece.

(4) Measurement of Embedding Depth of Fiber

The embedding depth of the fiber is measured for the test piece obtained by the procedure of the above (3) by using laser of a laser Raman spectrophotometer (JASCO Corporation NRS-3200) and a 532 nm notch filter. First, the surface of the single-fiber is irradiated with laser beam and the stage height was adjusted to minimize the diameter of the laser beam diameter. This stage height is designated as "A" (μm). Next, the surface of the test piece is irradiated with laser beam and the stage height as adjusted to minimize the diameter of the laser beam diameter. This stage height is designated as "B" (μm). The embedding depth d (μm) of the fiber is calculated by using a refractive index 1.732 of the resin measured by using laser as mentioned above by formula (4):

$$d = (A-B) \times 1.732 \qquad (4).$$

(5) 4 Point Bending Test

The test piece obtained by the procedure of the above (3) is applied with compressive strain by the 4 point bending test method using a jig having outer indenters provided at an interval of 50 mm and inner indenters provided at an interval of 20 mm. The strain is applied in stepwise manner by an increment of 0.1%, and the test piece was observed by a polarization microscope to measure the number of broken single-filaments in the area with the width of 5 mm at the center in the longitudinal direction of the test piece. The double value of the measured number of breaks is defined as the number of broken fibers (filaments/10 mm), and the compressive stress calculated from the compressive strain when the average number of broken pieces of the test number 30 exceeds 1 filament/10 mm is defined as the single-fiber compressive strength. The strain ε (%) of the single-fiber composites is also measured by using a strain gauge attached at a position about 5 mm in width direction from the center of the test piece. Final compressive strain $\varepsilon_c$ of the single-fiber composites is calculated by considering gauge factor κ of the strain gauge, the embedding depth d (μm) of the fiber measured by the procedure of (4) above, and the residual strain of 0.14(%) by formula (5):

$$\varepsilon_c = \varepsilon \times (2/\kappa) \times (1 - d/1000) - 0.14 \qquad (5).$$

Crystallite Size Lc

The carbon fiber bundle used in the measurement is aligned and fixed by using an alcohol solution of collodion to prepare a measurement sample of quadrangular prism (length, 4 cm; side length, 1 mm). The thus prepared measurement sample is measured with a wide angle X ray diffractometer under the following conditions:

X-ray source: CuKα ray (tube voltage 40 kV, tube current 30 mA),
Detector: goniometer+monochromator+scintillation counter,
Scan range: 2θ=10 to 40°
Scan mode: step scan; step unit, 0.01°; scanning speed, 1°/min.

In the thus obtained diffraction pattern, peak fitting is performed using Gaussian with respect to the peak near the 2θ=25 to 26°. Full width at half maximum is determined, and the crystallite size is calculated from this value by the following Scherrer's equation:

$$\text{Crystallite size (nm)} = K\lambda/\beta_0 \cos \theta_B$$

with the proviso
K: 1.00, λ: 0.15418 nm (wavelength of the X ray)
$\beta_0$: $(\beta E^2 - \beta_1^2)^{1/2}$
PE: apparent full width at half maximum (measurement) rad,
$\beta_1$: $1.046 \times 10^{-2}$ rad
$\theta_B$: Bragg's diffraction angle.

This measurement is performed ten times per one level, and the average of the obtained values is defined as the crystallite size. In the Examples and Comparative Examples, XRD-6100 manufactured by SHIMADZU CORPORATION was used as a wide angle X-ray diffractometer.

When measuring from a carbon fiber single-fiber, a single-fiber is randomly extracted from a carbon fiber bundle, and wide-angle X-ray diffraction measurement is performed using an apparatus capable of using X-ray μ beam. The measurement is performed using microbeam having a wavelength of 0.1305 nm arranged in a shape of 3 μm in the fiber axis direction and 1 μm in the fiber diameter direction, while scanning single-fibers in the fiber diameter direction in 1 μm process. The irradiation time for each process is 2 seconds. The camera length, which is the distance between a detector and a sample, is set to fall in a range of 40 to 200 mm. The coordinates of the camera length and the beam center are obtained by measuring cerium oxide as a standard sample. By subtracting the two-dimensional diffraction pattern measured by removing the sample from the detected two-dimensional diffraction pattern, the dark noise due to the detector and the scattering noise due to the air are canceled to obtain the corrected two-dimensional diffraction pattern. By adding the corrected two-dimensional diffraction patterns at each position in the fiber diameter direction of the single-fiber, the average two-dimensional diffraction pattern in the fiber diameter direction of the single-fiber is obtained. In this average two-dimensional diffraction pattern, sector integration is performed at an angle of ±5° centering on the direction orthogonal to the fiber axis to obtain a diffraction intensity profile in the 2θ direction. The least squares fitting of the diffraction intensity profile in the 2θ direction is performed using two Gaussian functions, and the angle $2θ_m$ (°) of 2θ at which the diffraction intensity is maximum and the full width at half maximum FWHM (°) of the combined function of the two Gaussian functions are calculated. Further, circumferential integration is performed with a width of ±5° around the angle 2θm (°) when the diffraction intensity profile in the 2θ direction becomes the maximum, and the diffraction intensity profile in the circumferential direction is acquired. The crystallite size Lc of the single-fiber is obtained by the following formula, and the results for each of the three single-fibers are averaged and calculated.

$$Lc \text{ (nm)} = Kλ/\text{FWHM} \cos(2θ_m/2):$$

where the Scherrer coefficient K is 1.0, the X-ray wavelength λ is 0.1305 nm, and the full width at half maximum FWHM and $2θ_m$ are used after converting the unit into radian (rad) from angle (°).

Measurement of Tensile Modulus of Cured Product of Thermosetting Resin

A resin component of a thermosetting resin is charged in a kneader and the temperature was raised to 150° C. while kneading, followed by kneading at the same temperature for 1 hour. Then, the temperature is fallen to 60° C. while kneading. Thereafter, a curing agent and a curing accelerator are added, followed by further kneading to obtain an uncured thermosetting resin. After defoaming the uncured thermosetting resin in a vacuum, the uncured thermosetting resin is cured in a mold in which a 2 mm thick "Teflon (registered trademark)" spacer is used to set the thickness to 2 mm at a temperature of 130° C. for 2 hours to obtain a cured product of the thermosetting resin having a thickness of 2 mm. A test piece having a width of 10 mm and a length of 60 mm is cut out from this cured product, and then 3 point bending was performed at a length between spans of 32 mm and a crosshead speed of 2.5 mm/min in accordance with JIS-K7171 (1994) to measure the tensile modulus. The number of samples is five, and the average thereof is defined as the tensile modulus of the resin cured product.

Measurement of 0° Compressive Strength of Carbon Fiber-Reinforced Composite Material Raw material resins for thermosetting resin excluding a curing agent and a curing accelerator are mixed by a kneader, followed by stirring for 1 hour to obtain a resin composition. Next, the resin composition thus obtained is applied to the silicone surface of a release paper coated with silicone to obtain a resin film. The obtained resin film is wound around the surface of a steel drum having a circumference of about 2.7 m and a temperature adjusted to 60 to 70° C., with the surface of the resin composition facing outside. Next, a carbon fiber bundle unwound from a creel is arranged on the surface of the resin composition wound around the steel drum via a traverse. The surface of the resin composition is covered with the resin film on the carbon fiber bundle side, and a roll separately prepared is pressed against the surface of the outer resin film while being contact rotated to impregnate the resin into the fiber bundle, thus fabricating a unidirectional prepreg having a width of 300 mm and a length of 2.7 m. The fiber basis weight of the prepreg is adjusted to 190 to 200 g/m² by adjusting the rotational speed of the drum and the feed speed of the traverse. A plurality of the obtained prepregs are laminated with the fiber direction aligned in one direction, treated at a temperature of 130° C. and a pressure of 0.3 MPa for 2 hours to cure the resin, thus obtaining a laminate having a thickness of 1 mm (fiber-reinforced composite material). A test piece having a thickness of 1±0.1 mm, a width of 12.7±0.13 mm, a length of 80±0.013 mm, and a gauge length of 5±0.13 mm is cut out from the laminate. At both ends of the test piece (37.5 mm each from both ends), a reinforcing plate is fixed with an adhesive, thereby adjusting to the gauge length of 5±0.13 mm. In accordance with ASTM D695 (1996), the compressive strength is measured for the number of test pieces under the condition at a strain rate of 1.27 mm/min, and the obtained compressive strength is converted into a fiber volume fraction of 60%. It is measured at n=6, and the average thereof is defined as the 0° compressive strength of the carbon fiber-reinforced composite material.

Average Single-Fiber Diameter of Carbon Fibers

The single-fiber cross section of the carbon fiber to be evaluated is observed by a scanning electron microscope to evaluate the cross-sectional area. The diameter of a perfect circle having the same cross-sectional area as this cross-sectional area is calculated and defined as the single-fiber diameter. The acceleration voltage is 5 keV.

In the Examples and Comparative Examples, a scanning electron microscope (SEM) "S-4800" manufactured by Hitachi High-Technologies Corporation was used as the scanning electron microscope.

Twist Angle of Surface Layer of Fiber Bundle

The twist angle (°) of the surface layer of the fiber bundle in the carbonization process is determined in the following manner: a diameter (μm) of the entire fiber bundle is calculated from the number of twists (turns/m) of the fiber bundle in the carbonization process, the number of filaments, and the diameter (μm) of the single-fiber of the obtained carbon fibers by the following formula, followed by calculation using the diameter of the entire fiber bundle as follows:

Diameter (μm) of entire fiber bundle={(diameter of single-fiber)²×number of filaments}$^{0.5}$ Remaining twist angle (°) of fiber bundle surface layer=a tan (diameter of entire fiber bundle× 10$^{-6}$×π×the number of twists).

EXAMPLES

Our carbon fiber bundles, methods and composite materials will be more specifically described below by way of Examples. The measuring method used in Examples is as mentioned above.

Reference Examples 1 to 4

A polyacrylonitrile copolymer was produced by polymerizing the polyacrylonitrile copolymer copolymerized with itaconic acid by a solution polymerization method using dimethyl sulfoxide as a solvent. A coagulated yarn was obtained using a dry jet wet spinning method, where the obtained spinning dope solution was once extruded into the air from a spinneret, passed through a space of about 4 mm and then introduced into a coagulation bath of a 35% aqueous solution of dimethyl sulfoxide controlled to 3° C. This coagulated yarn was washed with water by a conventional method, and then stretched in a hot water bath of 2 tanks by 3.5 times in a water bath. To this fiber bundle after stretching in the water bath, an amino-modified silicone oil agent was applied, and a densification treatment by drying was performed using heating rollers at 160° C. After bringing two yarns together so that the single-fiber number of the fiber bundle was 12,000, the fiber bundle was stretched 3.7 times in high pressure steam so that the total stretching after the spinning was 13 times. The fiber bundle was then interlaced to obtain a polyacrylonitrile-based precursor fiber bundle comprising 12,000 single-fibers each having a crystal orientation degree of 93%. The interlacing treatment was performed by using a fluid spray nozzle having eight ejection orifices arranged around the fiber bundle so that the fluid spray direction was at 90° with the longitudinal direction of the fiber bundle and each ejection orifice faced with another ejection orifice at opposite sides of the fiber bundle forming an ejection orifice pair. In the interlacing, the condition was adjusted so that the tension of the fiber bundle was 3 mN/dtex and the fluid ejection pressure was 0.35 MPa. Next, the precursor fiber bundle was subjected to a stabilization treatment at a stabilization temperature of 210 to 280° C. to obtain a stabilized fiber bundle. The stabilization treatment was performed by adjusting the stabilization time to form a stabilized structure shown in Table 1 while stretching the polyacrylonitrile-based precursor fiber bundle at a stretching ratio of 1 in an oven in a nitrogen atmosphere.

Reference Example 5

In the same manner as in Reference Examples 1 to 4, a polyacrylonitrile-based precursor fiber bundle was obtained, and the tension controlled by adjusting the stabilization time and the stretching ratio at the stabilization temperature of 210 to 280° C. to form the stabilized structure shown in Table 1. Then, the polyacrylonitrile-based precursor fiber bundle was subjected to a stabilization treatment in an oven in a nitrogen atmosphere to obtain a stabilized fiber bundle.

Examples 1 to 8 and 12, Comparative Examples 1 to 7

The stabilized fiber bundle obtained in Reference Examples was subjected to a pre-carbonization treatment in a nitrogen atmosphere at a temperature of 300 to 800° C. to obtain a pre-carbonized fiber bundle. The pre-carbonized fiber bundle thus obtained was subjected to a carbonization treatment in a nitrogen atmosphere at the maximum temperature, the tension and the retention time shown in Table 2. The carbon fiber bundle thus obtained was subjected to a surface treatment and a sizing agent coating treatment to obtain a final carbon fiber bundle. Using this carbon fiber bundle, a prepreg and a carbon fiber-reinforced composite material were prepared with the resin composition shown below. Physical properties of the thus obtained carbon fiber bundle and fiber-reinforced composite material are shown in Table 3. The tensile modulus of a resin cured product with the same resin composition was measured, and the tensile modulus was found to be 4.4 GPa.

Resin Composition
  Liquid bisphenol A type epoxy resin ("jER (registered trademark)" 828: manufactured by Mitsubishi Chemical Corporation): 20 parts by mass
  Triglycidyl-m-aminophenol ("Araldite (registered trademark)" MY0600: manufactured by Huntsman Advanced Materials): 50 parts by mass
  Phenol novolac type epoxy ("jER (registered trademark)" 154: manufactured by Mitsubishi Chemical Corporation): 30 parts by mass
Curing Agent:
  Dicyandiamide (manufactured by Mitsubishi Chemical Corporation): 6 parts by mass Curing accelerator:
  3-(3,4-Dichlorophenyl)-1,1-dimethylurea (manufactured by HODOGAYA CHEMICAL CO., LTD.): 3 parts by mass

Comparative Example 8

Using a carbon fiber bundle "TORAYCA (registered trademark)" M40S (strand tensile modulus: 380 GPa, single-fiber compressive strength: 3.0 GPa (manufactured by Toray Industries, Inc.)), a prepreg and a carbon fiber-reinforced composite material were fabricated with the resin composition shown below. The 0° compressive strength was measured, and it was found to be 1.3 GPa, which was lower than the 0° compressive strength of the composite materials of Examples 1 to 8. tensile modulus of a resin cured product with the same resin composition was measured, and the tensile modulus was found to be 3.3 GPa.

Resin Composition
  Liquid bisphenol A diglycidyl ether resin ("jER (registered trademark)" 1001: manufactured by Mitsubishi Chemical Corporation): 20 parts by mass: 30 parts by mass
  Liquid bisphenol A type epoxy resin ("jER (registered trademark)" 828: manufactured by Mitsubishi Chemical Corporation): 30 parts by mass
  Phenol novolac polyglycidyl ether resin ("EPICLON" (registered trademark) N740 (manufactured by DIC Corporation): 27 parts by mass
  Polyvinyl formal resin ("VINYLEC (registered trademark)" PVF-K, manufactured by JNC Corporation): 5 parts by mass
Curing Agent:
  Dicyandiamide (manufactured by Mitsubishi Chemical Corporation): 6 parts by mass
Curing Accelerator:
  3-(3,4-Dichlorophenyl)-1,1-dimethylurea (manufactured by HODOGAYA CHEMICAL CO., LTD.): 3 parts by mass.

Comparative Example 9

Using a carbon fiber bundle "TORAYCA (registered trademark)" M40S (strand tensile modulus: 380 GPa, single-fiber compressive strength: 3.0 GPa (manufactured by Toray Industries, Inc.)), a prepreg and a carbon fiber-reinforced composite material were fabricated with the same resin composition as in Example 1. The 0° compressive strength was measured, and it was found to be 1.3 GPa. The 0° compressive strength of the fiber-reinforced composite material is the same as that of Comparative Example 8 despite high resin tensile modulus. As a result, we found that the 0° compressive strength of the carbon fiber composite material is not improved even when only the resin tensile modulus is increased.

Examples 9 and 10, Comparative Examples 10 and 11

The stabilized fiber bundle obtained in Reference Example 5 was twisted to give a twist of 50 turns/m, and then a pre-carbonization treatment was performed in a nitrogen atmosphere at a temperature of 300 to 800° C. to obtain a pre-carbonized fiber bundle. The pre-carbonized fiber bundle thus obtained was subjected to a carbonization treatment in a nitrogen atmosphere at the maximum temperature, the tension and the retention time shown in Table 2. Physical properties of the thus obtained carbon fiber bundle and fiber reinforced composite material are shown in Table 3. Regarding the crystallite size Lc and the initial modulus $E_0$ of Example 9, the results evaluated by the carbon fiber bundle were as follows: Lc=2.98 nm and $E_0$=331 GPa, and the results evaluated from the single-fiber were as follows: Lc=3.00 nm and $E_0$=320 GPa, and the differences were 1% and 3%, respectively.

Example 11

In the same manner as in Example 10, except that the twist of 20 turns/m was applied in the twisting process, a carbon fiber bundle was obtained. Physical properties of the thus obtained carbon fiber bundle and fiber-reinforced composite material are shown in Table 3.

Example 13

In the same manner as in Example 11, except that the twist of 10 turns/m was applied in the twisting process, a carbon fiber bundle was obtained. Physical properties of the thus obtained carbon fiber bundle and fiber-reinforced composite material are shown in Table 3.

Example 14

In the same manner as in Example 13, except that the number of single-fibers of the polyacrylonitrile-based precursor fiber bundle to be subjected to the stabilization treatment was 24,000 and the twist of 30 turns/m was applied in the twisting process, a carbon fiber bundle was obtained. Physical properties of the thus obtained carbon fiber bundle and fiber-reinforced composite material are shown in Table 3.

Example 15

In the same manner as in Example 14, except that the twist of 10 turns/m was applied in the twisting process, a carbon fiber bundle was obtained. Physical properties of the thus obtained carbon fiber bundle and fiber-reinforced composite material are shown in Table 3.

TABLE 1

|  | IR peak ratio 1,453 cm$^{-1}$/ 1370 cm$^{-1}$ | IR peak ratio 1,254 cm$^{-1}$/ 1,370 cm$^{-1}$ | Tension of stabilization process mN/dtex |
|---|---|---|---|
| Reference Example 1 | 0.63 | 0.60 | 1.1 |
| Reference Example 2 | 0.70 | 0.61 | 1.3 |
| Reference Example 3 | 0.64 | 0.62 | 1.1 |
| Reference Example 4 | 0.80 | 0.64 | 1.5 |
| Reference Example 5 | 0.63 | 0.60 | 1.5 |

TABLE 2

|  | Maximum carbonization temperature: T ° C. | 2.00 × 10$^{-3}$ × T − 0.90 | Tension of carbonization process mN/dtex | Number of twists of carbonization process T/m | Twist angle of surface layer of fiber bundle of carbonization process ° | Retention time of carbonization process when retention time of Example 1 is regarded as 1 |
|---|---|---|---|---|---|---|
| Example 1 | 2,050 | 3.20 | 4.9 | 0 | 0.0 | 1.0 |
| Example 2 | 2,000 | 3.10 | 4.8 | 0 | 0.0 | 1.0 |
| Example 3 | 2,100 | 3.30 | 5.7 | 0 | 0.0 | 1.0 |
| Example 4 | 1,800 | 2.70 | 4.3 | 0 | 0.0 | 1.5 |
| Example 5 | 1,800 | 2.70 | 5.5 | 0 | 0.0 | 1.5 |
| Example 6 | 1,900 | 2.90 | 4.7 | 0 | 0.0 | 1.1 |
| Example 7 | 2,000 | 3.10 | 4.3 | 0 | 0.0 | 1.1 |
| Example 8 | 2,050 | 3.20 | 4.0 | 0 | 0.0 | 1.1 |
| Example 9 | 1,900 | 2.90 | 6.0 | 50 | 7.3 | 1.5 |
| Example 10 | 1,900 | 2.90 | 10.0 | 50 | 7.4 | 1.5 |
| Example 11 | 1,900 | 2.90 | 10.0 | 20 | 2.8 | 1.5 |
| Example 12 | 2,050 | 2.90 | 4.9 | 0 | 0.0 | 0.9 |
| Example 13 | 1,900 | 2.90 | 10.0 | 10 | 1.4 | 1.5 |
| Example 14 | 1,900 | 2.90 | 10.0 | 30 | 6.0 | 1.5 |
| Example 15 | 1,900 | 2.90 | 10.0 | 10 | 2.0 | 1.5 |
| Comparative Example 1 | 1,490 | 2.08 | 4.8 | 0 | 0.0 | 1.0 |
| Comparative Example 2 | 2,000 | 3.10 | 4.3 | 0 | 0.0 | 0.3 |
| Comparative Example 3 | 1,800 | 2.70 | 3.5 | 0 | 0.0 | 1.5 |
| Comparative Example 4 | 1,350 | 1.80 | 13.0 | 0 | 0.0 | 0.9 |

TABLE 2-continued

|  | Maximum carbonization temperature: T °C. | $2.00 \times 10^{-3} \times T - 0.90$ | Tension of carbonization process mN/dtex | Number of twists of carbonization process T/m | Twist angle of surface layer of fiber bundle of carbonization process ° | Retention time of carbonization process when retention time of Example 1 is regarded as 1 |
|---|---|---|---|---|---|---|
| Comparative Example 5 | 1,800 | 2.70 | 6.5 | 0 | 0.0 | 1.5 |
| Comparative Example 6 | 1,800 | 2.70 | 6.0 | 0 | 0.0 | 0.6 |
| Comparative Example 7 | 2,000 | 3.10 | 6.0 | 0 | 0.0 | 0.6 |
| Comparative Example 10 | 1,900 | 2.90 | 1.0 | 50 | 5.3 | 0.7 |
| Comparative Example 11 | 1,900 | 2.90 | 1.0 | 50 | 5.3 | 1.5 |

TABLE 3

|  | Stabilization conditions | Specific gravity SG — | Right side of formula (4) $0.0633 \times Lc + 1.565$ — | Single-fiber diameter μm | Single-fiber compressive strength Fc GPa | Crystallite size Lc nm | Right side of formula (1) $1.3 \times 10/Lc$ (nm) − 0.3 — |
|---|---|---|---|---|---|---|---|
| Example 1 | Reference Example 1 | 1.775 | 1.774 | 5.5 | 4.4 | 3.30 | 3.6 |
| Example 2 | Reference Example 1 | 1.770 | 1.768 | 5.5 | 4.7 | 3.20 | 3.8 |
| Example 3 | Reference Example 1 | 1.786 | 1.780 | 5.5 | 4.2 | 3.39 | 3.5 |
| Example 4 | Reference Example 2 | 1.774 | 1.743 | 5.0 | 4.7 | 2.81 | 4.3 |
| Example 5 | Reference Example 2 | 1.770 | 1.743 | 5.0 | 4.8 | 2.81 | 4.3 |
| Example 6 | Reference Example 3 | 1.768 | 1.757 | 5.4 | 4.7 | 3.03 | 4.0 |
| Example 7 | Reference Example 3 | 1.777 | 1.769 | 5.4 | 4.5 | 3.23 | 3.7 |
| Example 8 | Reference Example 3 | 1.788 | 1.776 | 5.4 | 4.3 | 3.33 | 3.6 |
| Example 9 | Reference Example 5 | 1.720 | 1.745 | 7.4 | 4.9 | 2.84 | 4.3 |
| Example 10 | Reference Example 5 | 1.738 | 1.751 | 7.5 | 4.5 | 2.94 | 4.1 |
| Example 11 | Reference Example 5 | 1.740 | 1.751 | 7.2 | 4.3 | 2.94 | 4.1 |
| Example 12 | Reference Example 1 | 1.760 | 1.773 | 5.5 | 4.2 | 3.29 | 3.7 |
| Example 13 | Reference Example 5 | 1.740 | 1.751 | 7.2 | 4.3 | 2.94 | 4.1 |
| Example 14 | Reference Example 5 | 1.739 | 1.751 | 7.2 | 4.3 | 2.94 | 4.1 |
| Example 15 | Reference Example 5 | 1.739 | 1.751 | 7.2 | 4.2 | 2.94 | 4.1 |
| Comparative Example 1 | Reference Example 3 | 1.800 | 1.704 | 5.5 | 4.8 | 2.20 | 5.6 |
| Comparative Example 2 | Reference Example 3 | 1.690 | 1.756 | 5.4 | 4.4 | 3.01 | 4.0 |
| Comparative Example 3 | Reference Example 2 | 1.770 | 1.743 | 5.1 | 4.6 | 2.81 | 4.3 |
| Comparative Example 4 | Reference Example 3 | 1.800 | 1.673 | 5.4 | 5.2 | 1.70 | 7.3 |
| Comparative Example 5 | Reference Example 2 | 1.770 | 1.743 | 5.1 | 4.7 | 2.81 | 4.3 |
| Comparative Example 6 | Reference Example 4 | 1.744 | 1.723 | 4.9 | 4.5 | 2.50 | 4.9 |
| Comparative Example 7 | Reference Example 4 | 1.740 | 1.742 | 4.9 | 4.2 | 2.80 | 4.3 |
| Comparative Example 8 | — | 1.800 | 1.827 | 5.4 | 3.0 | 4.14 | 2.8 |

TABLE 3-continued

| | | | | | | | |
|---|---|---|---|---|---|---|---|
| Comparative Example 9 | — | 1.800 | 1.827 | 5.4 | 3.0 | 4.14 | 2.8 |
| Comparative Example 10 | Reference Example 5 | 1.703 | 1.742 | 7.5 | 4.1 | 2.80 | 4.3 |
| Comparative Example 11 | Reference Example 5 | 1.720 | 1.742 | 7.4 | 4.1 | 2.98 | 4.1 |

| | Initial modulus in strand tensile test $E_0$ GPa | Right side of formula (2) $80*Lc$ (nm) + 155 | Number of fuzzes existing in carbon fiber bundle fuzzes/m | Tear-able length mm | Strand tensile strength GPa | Strand tensile modulus GPa | 0° Compressive strength of unidirectional fiber-reinforced composite material GPa |
|---|---|---|---|---|---|---|---|
| Example 1 | 338 | 419 | 1.0 | 960 | 5.7 | 377 | 1.6 |
| Example 2 | 341 | 411 | 1.0 | 900 | 5.8 | 370 | 1.7 |
| Example 3 | 350 | 426 | 1.0 | 940 | 5.7 | 382 | 1.6 |
| Example 4 | 345 | 380 | 1.0 | 1,000 | 7.6 | 380 | 1.8 |
| Example 5 | 359 | 380 | 2.0 | 1,000 | 7.7 | 395 | 1.8 |
| Example 6 | 342 | 397 | 1.0 | 1,000 | 5.5 | 373 | 1.7 |
| Example 7 | 356 | 413 | 1.0 | 1,000 | 5.2 | 389 | 1.7 |
| Example 8 | 352 | 421 | 0.5 | 1,000 | 5.4 | 390 | 1.6 |
| Example 9 | 331 | 382 | 1.0 | — | 4.1 | 367 | 1.8 |
| Example 10 | 357 | 390 | 2.0 | — | 4.3 | 392 | 1.7 |
| Example 11 | 374 | 390 | 2.0 | — | 4.5 | 408 | 1.6 |
| Example 12 | 338 | 418 | 1.0 | 900 | 5.7 | 377 | 1.5 |
| Example 13 | 380 | 390 | 5.0 | — | 4.6 | 396 | 1.6 |
| Example 14 | 375 | 390 | 2.0 | — | 4.2 | 389 | 1.6 |
| Example 15 | 376 | 390 | 5.0 | — | 4.0 | 390 | 1.6 |
| Comparative Example 1 | 285 | 331 | 0.5 | 1,000 | 7.2 | 320 | 1.9 |
| Comparative Example 2 | 311 | 396 | 0.5 | 1,000 | 5.3 | 354 | 1.4 |
| Comparative Example 3 | 310 | 380 | 0.0 | 1,000 | 7.8 | 350 | 1.3 |
| Comparative Example 4 | 334 | 291 | 5.0 | 600 | 6.9 | 365 | 1.6 |
| Comparative Example 5 | 390 | 380 | 10.0 | 1,000 | 5.5 | 420 | 1.5 |
| Comparative Example 6 | 325 | 355 | 0.5 | 650 | 7.1 | 365 | 1.7 |
| Comparative Example 7 | 340 | 379 | 0.5 | 650 | 6.9 | 385 | 1.6 |
| Comparative Example 8 | 350 | 486 | — | — | 4.9 | 380 | 1.3 |
| Comparative Example 9 | 350 | 486 | — | — | 4.9 | 380 | 1.3 |
| Comparative Example 10 | 254 | 379 | 0.0 | — | 4.3 | 294 | 1.6 |
| Comparative Example 11 | 294 | 393 | 0.5 | — | 4.4 | 330 | 1.6 |

The invention claimed is:

1. A carbon fiber bundle wherein a relationship among a crystallite size Lc (nm), a single-fiber compressive strength Fc (GPa) measured by a compressive fragmentation method of single-fiber composites, and an initial modulus $E_0$ (GPa) in a resin-impregnated strand tensile test simultaneously satisfies formulas (1) to (3), and Lc is 4.00 nm or less:

$$Fc \geq 1.3 \times 10/Lc - 0.3 \quad (1)$$

$$E_0 \leq 80 \times Lc + 155 \quad (2)$$

$$E_0 \geq 330 \quad (3).$$

2. The carbon fiber bundle according to claim 1, which is substantially not twisted.

3. The carbon fiber bundle according to claim 1, wherein Lc is 2.60 nm or more.

4. The carbon fiber bundle according to claim 1, wherein a number of fuzzes existing in the carbon fiber bundle is 2/m or less.

5. The carbon fiber bundle according to claim 1, wherein an average tearable length is 800 to 1,100 mm.

6. The carbon fiber bundle according to claim 1, wherein a strand tensile strength is 4.8 GPa or more.

7. The carbon fiber bundle according to claim 1, wherein a single-fiber diameter is 5.0 μm or more and a relationship between a crystallite size Lc (nm) and a specific gravity SG determined by the Archimedean method satisfies formulas (4) and (5):

$$SG \geq 0.0633 \times Lc + 1.565 \quad (4)$$

$$2.85 \leq Lc \leq 4.00 \quad (5).$$

8. The carbon fiber bundle according to claim 1, wherein the single-fiber diameter is 6.0 μm or more.

9. A prepreg comprising the carbon fiber bundle according to claim 1 impregnated with a thermosetting resin, wherein a cured product of the thermosetting resin has a tensile modulus of 3.0 GPa or more.

10. A carbon fiber-reinforced composite material comprising the carbon fiber bundle according to claim 1 and a matrix resin.

\* \* \* \* \*